Aug. 18, 1959
G. VANDE SANDE
2,900,497

AUTOMATIC SWITCHING SYSTEM

Filed June 14, 1956
4 Sheets-Sheet 1

INVENTOR.
G. VANDE SANDE
BY
Forest B. Hitchcock
HIS ATTORNEY

AUTOMATIC SWITCHING SYSTEM

Filed June 14, 1956

4 Sheets-Sheet 2

INVENTOR.

G. VANDE SANDE

BY Forest B. Hitchcock

HIS ATTORNEY

Aug. 18, 1959

G. VANDE SANDE 2,900,497

AUTOMATIC SWITCHING SYSTEM

Filed June 14, 1956

4 Sheets-Sheet 3

INVENTOR.
G. VANDE SANDE
BY
Forest B. Hitchcock
HIS ATTORNEY

INVENTOR.
G. VANDE SANDE
BY
Forest B. Hitchcock
HIS ATTORNEY 2,900,497

AUTOMATIC SWITCHING SYSTEM

George Vande Sande, Rochester, N.Y., assignor to General Railway Signal Company, Rochester, N.Y.

Application June 14, 1956, Serial No. 591,463

11 Claims. (Cl. 246—2)

This invention relates to an automatic switching system, and more particularly pertains to a system providing for the automatic routing of the cars of a railroad train to their predetermined classification tracks in a classification yard.

In a car classification yard, a received train of cars is broken into cuts, each comprising one or more cars, and each cut is routed from the primary track on which it originates, over a plurality of route selecting switches, to one of a number of classification tracks. To facilitate the movement of the cuts to their destination tracks, a system has been devised for automatically operating the various switches ahead of each cut so that it will eventually reach its predetermined classification track.

In this prior system, information as to the intended classification track of each cut is put into the system in the form of a multi-digit code, one digit for each switch the car must traverse. Each digit is selectively of one or the other of two distinctive characters so as to designate whether the corresponding switch is to be operated to the normal or reverse positions, respectively. This route-designating code is routed to the respective switch controlling circuits in accordance with the routing and progress of the cut as it moves through the yard. The storage of the code and its transfer through the system is accomplished by electromagnetic relays. When a digit of the code has been utilized to control a particular switch, that digit is dropped from the code, and the remainder of the code is transferred along to be effective in controlling the next switch. Such a system of automatic switch control is fully disclosed in Patent No. 2,194,353, issued March 19, 1940, to Brown et al.

According to the present invention, the automatic control of the switches is accomplished in an entirely different manner, not utilizing coded information regarding the route of each cut, but instead comprising a symmetrical matrix of bi-stable state storage devices. For each classification track, there is a corresponding column in the matrix having a storage device for each switch that must be traversed by a cut in travelling through the yard to the particular classification track represented by that column, plus other additional storage devices interspersed between these as required to give additional storage capacity. To route a cut to a particular classification track, the uppermost storage device in the column corresponding to that track is operated from the normal state to the opposite or abnormal state. As the cut progresses through the yard, this abnormal state is transferred from one storage device to the other successively in that column.

With this arrangement of the matrix, it follows that there must be at least two storage devices in the matrix relating to any particular switch. Actually, the number of storage devices in the matrix provided for the control of a particular track switch equals the number of classification tracks emanating from that switch. For example, all the classification tracks of the yard emanate from the first track switch, therefore, each column has a storage device for the control of that switch.

However, only two classification tracks emanate from the last switch in a particular route. Therefore, only the two columns corresponding to these two adjoining classification tracks contain storage devices for such switch.

If a cut must travel over the first track switch in its normal position in order to reach its preselected classification track, then the storage device provided for that switch in the related column of the matrix is effective, when controlled to its abnormal state indicating that a car is being routed to that classification track, to operate the switch to its normal position. However, if the cut designation appears in a different column relating to a route requiring this switch to be in the reverse position, then the storage device provided for that switch in the column is effective, when controlled to its abnormal state, to operate the switch to such reverse position.

The transfer of a cut description through a column of the matrix from one row to the next is accomplished by transfer means which is effective to transfer the car description ahead only if all the storage devices in the next row ahead relating to the next switch to be operated are then all in the normal state indicating that there is no cut description then being stored in the adjoining row. The transfer circuit means not only transfers the abnormal state of a storage device from one row to the next but is also effective, when the transfer has been made to the adjoining row, to restore the storage device in the row above to its original, normal state. Thus, the presence of a cut in the switching system is at any time indicated by there being only one storage device in the entire matrix that is operated from its normal state.

One important advantage provided by the present invention is that the inoperative condition of a single storage device would generally only disable the particular column in which it occurs by making it impossible to transfer the cut description through that column. This means that only the one corresponding classification track is made unusable rather than a number or even all of the tracks as might readily occur in the coded type system of the prior art as already briefly described.

Although the system of this invention is particularly adapted for the automatic switching of freight cars in a railway car classification yard, it is clear that the general principles of this invention apply equally well whenever it is desired to selectively route vehicles or objects from a single primary track to a preselected one of a number of final destination tracks. This system may, therefore, also be advantageously used in the automatic routing of objects or materials on a conveyor system, for example.

It is, therefore, an object of this invention to provide an automatic switching system capable of automatically routing vehicles from a single or primary track over a plurality of route selecting switches to a preselected one of a number of destination tracks, which system comprises a matrix of bi-stable state storage devices.

Another object of this invention is to provide an automatic switching system having a matrix of bi-stable state storage devices wherein a separate column of the matrix is provided for each classification track and with at least one storage device in each column for each switch to be traversed in reaching the destination track corresponding to that column.

Another object of this invention is to provide an automatic switching system having a matrix of bi-stable state storage devices wherein each device is a gas discharge tube.

Still another object of this invention is to provide an automatic switching system having a matrix of bi-stable state storage devices and having transfer means capable of transferring the abnormal state of a device from one row to the next in a column only if all the devices in such next row corresponding to the next-to-be-operated switch are all in the normal state indicating that there is no car ahead whose description is being stored preparatory to operation of the switch.

Other objects, purposes and characteristic features of this invention will in part be obvious from the accompanying drawings and in part pointed out as the description of the invention progresses.

In describing this invention in detail, reference will be made to the accompanying drawings in which those parts having similar features and functions are designated throughout the several views by like reference and in which.

To simplify the illustrations and facilitate in the explanation of this invention, various parts and circuits have been shown diagrammatically, and certain conventional illustrations have been used. The drawings are made to make it easy to understand the principle and manner of operation of this invention rather than to illustrate the specific construction and arrangement of parts that might be used in practice. Various electron tubes and their elements and all other circuit components are shown in conventional form. The relays and their contacts are also illustrated diagrammatically instead of showing all of their details. Sources of electrical energy have been represented by conventional symbols. The symbols (B+) and the symbol for a ground represent connections to the opposite terminals of a source of energy suitable for the operation of the electron tubes and their associated apparatus. Similarly, the symbols (+) and (—) indicate opposite terminals of a source of lower voltage as required for operating relays, switch control circuits, etc.

Figure 1:
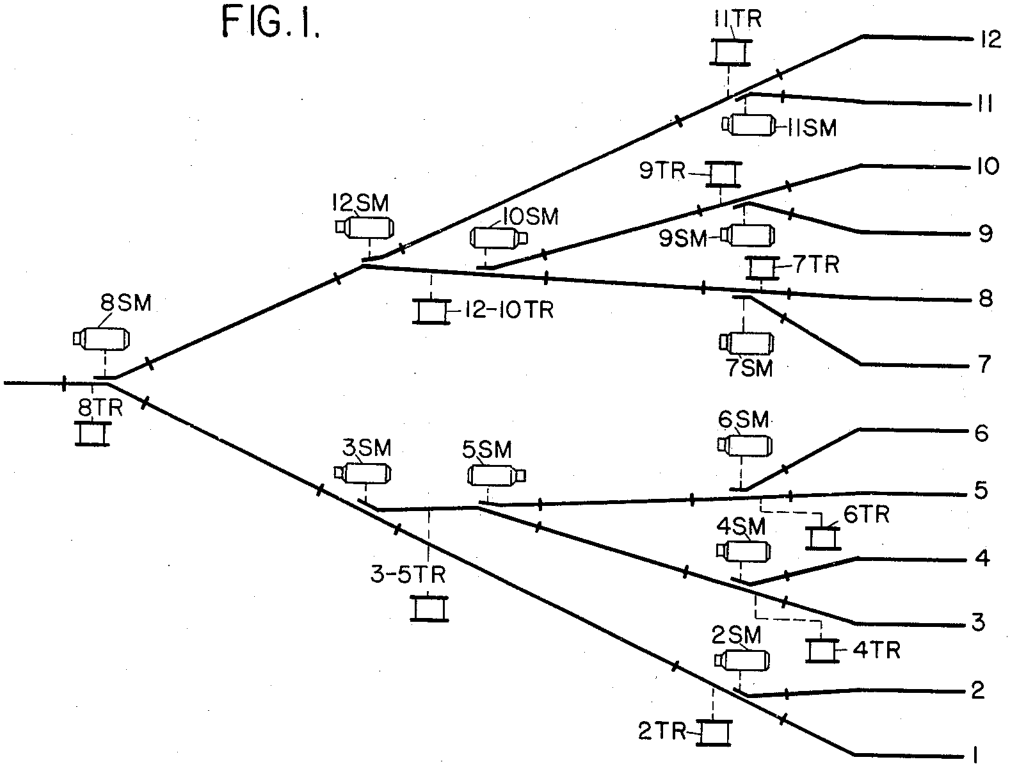
Fig. 1 represents diagrammatically the track layout of a typical car classification yard.

The layout of a typical car classification yard comprising twelve classification tracks is illustrated diagrammatically in Fig. 1. In a gravity yard, the profile is so arranged that a hump is provided ahead of the first track switch controlled by the switch machine 8SM. Each cut is uncoupled at the hump crest and then rolls by gravity over the various switches provided in its route to its destination track. Each switch machine in Fig. 1 bears a reference character relating it to the particular classification track that the associated switch gives access to when in its reverse position. Switch machine 3SM, for example, when it operates the associated track switch No. 3 to the reverse position, permits a car passing over it to travel to classification track No. 3. The switch machines 12SM and 10SM control the lap switches Nos. 12 and 10, respectively.

Figure 2:
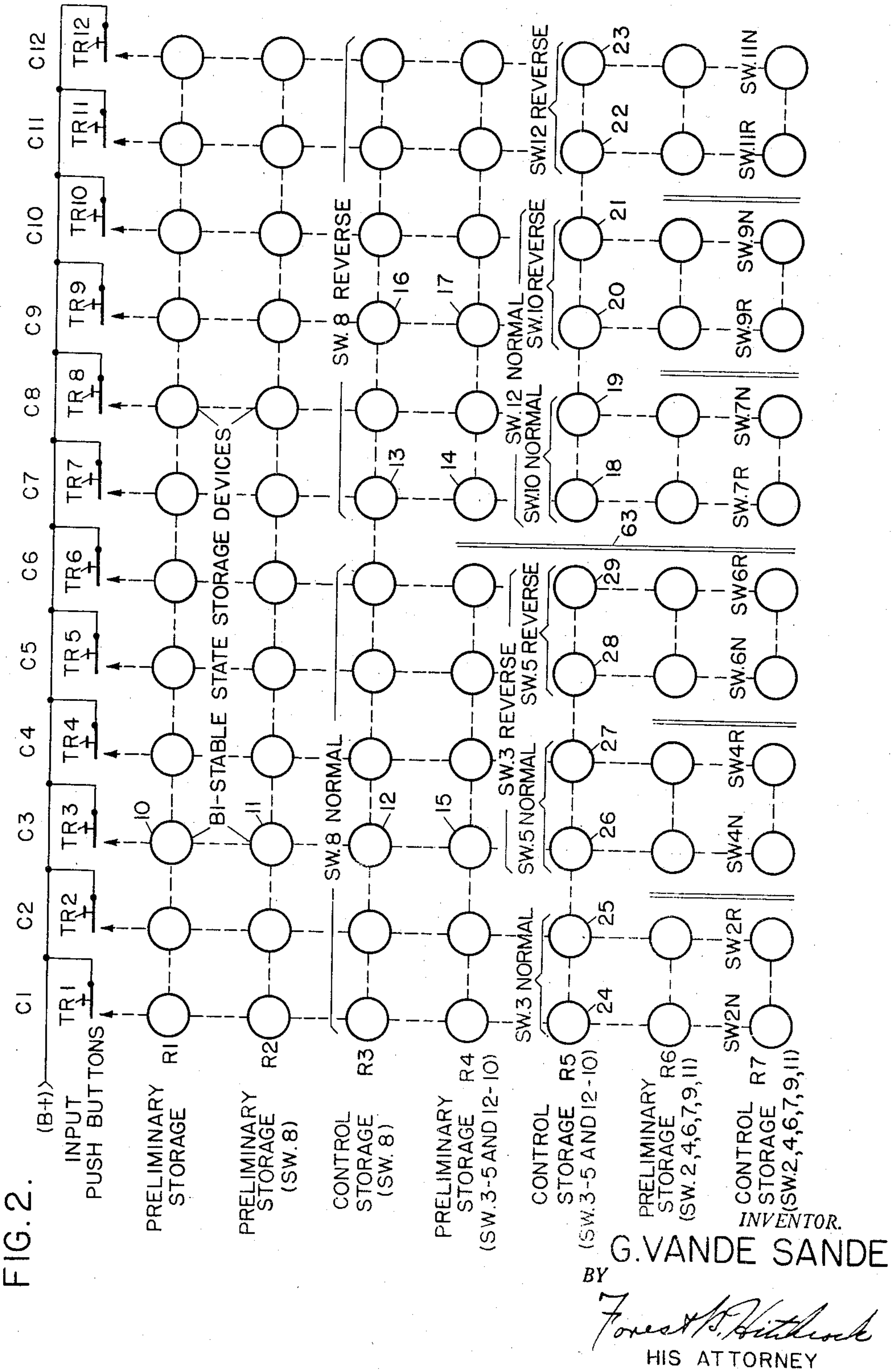
Fig. 2 illustrates diagrammatically the organization of the storage matrix of this invention.

The matrix of storage devices effective to automatically control the various switches of Fig. 1 is diagrammatically shown in Fig. 2. For each of the twelve classification tracks of Fig. 1, there is a corresponding vertical column in the matrix. Each column includes a plurality of bistable state storage devices which are, for convenience, represented in this Fig. 2 by a circle. Initially, all the storage devices of the matrix are in a particular one of their possible two states, and this is designated the "normal" state of the device.

When this system is to be effective in automatically controlling the track switches to route a car to a particular classification track, the required information is put into the storage matrix by operating the uppermost storage device in the column corresponding to the intended classification track from its normal state to the opposite or abnormal state. The various push buttons shown in Fig. 2, one for each column of the matrix, illustrate diagrammatically how the required information may be applied to the matrix. It will later be shown, in a specific embodiment of this invention, how the operation of a push button will render the uppermost storage device of the associated column to its abnormal state.

The first two top rows (horizontal) of the matrix comprise preliminary storages for holding information regarding preselected routes of cars prior to the entry of the information into the control storage for the control of the first switch, No. 8, in each row as represented by the third row of the matrix. Only two preliminary storage rows in the matrix are illustrated in Fig. 2; however, it may be desirable to provide more than two rows and, in fact, it may be desirable to provide sufficient rows of preliminary storage to enable all of the route descriptions for an entire train to be stored.

If it is assumed that information for one cut has been put into the matrix by momentarily depressing the push button representing the desired classification track for that car, then one of the storage devices of the first row is operated from the normal state, but all other devices in this row remain in the normal state. As soon as the one device of this upper row has been operated to its abnormal state, it provides a controlling influence on the storage device immediately below it attempting to operate such device to its normal state. This transfer can take place only if all of the storage devices in the row below are then in the normal state indicating that there is no description for another cut then occupying the storage represented by this next row below. If the second row is "empty," however, the transfer of the abnormal state from the first row to the second row is quickly made. Immediately upon its accomplishment, a restoring influence is effective from the second row back to the first to return the storage device immediately above back to its normal state. Consequently, only one storage device in the matrix is at any one time in the abnormal state for each cut whose description is then being stored in the matrix.

In a similar manner, a transfer is effected from the second row to the third row representing the actual control storage for the first switch machine 8SM. As before, the transfer can take place only if all of the storage devices of the third control storage row are then in the normal state.

To give a more specific example of the manner in which the transfer of information takes place through the matrix, assume that it is desired to route a car from the hump crest to classification track No. 3. To accomplish this, the required information is put into the matrix by depressing the push button designated TR3. This has the effect of immediately operating the storage device 10 from the normal to the abnormal state. If there is then no cut description in the preliminary storage for switch No. 8 represented by row 2, then the storage device 10 is immediately effective to operate storage device 11 to the abnormal state. As soon as this occurs, the storage device 10 is restored to its normal condition. With storage device 11 now in the abnormal state, it becomes effective immediately to operate storage device 12 to the abnormal state provided only that none of the storage device of row 3 is then in the abnormal state. The storage device 11 is itself immediately returned to the normal state as soon as storage device 12 reaches the abnormal state. If, however, any of the storage devices such as storage device 13 of the third row had been in the abnormal state then the transfer from storage device 11 to storage device 12 could not have taken place. Such transfer could be effected only when the abnormal state of device 13 had transferred to the similar device 14 in the adjoining row below. As will later be described, the transfer from storage device 13 to storage device 14 will be made to take place immediately upon the occupancy by the corresponding cut of the track section associated with the switch machine 8SM. This indicates that the information in the matrix has been effective in controlling the switch and further control of that switch from the matrix is not possible until the cut has passed on and left the associated track section unoccupied. Then, the third row of the matrix representing the control storage for switch No. 8 is emptied of the description for the preceding car so that it can then receive the information from the next following car by having its storage device 12 operated to the abnormal state.

For cuts which are to travel to classification tracks 1 to 6, switch No. 8 must be operated by the switch machine 8SM to the normal position. For cuts traveling to classification tracks 7 to 12, the switch machine 8SM must control the associated switch to its reverse position. To accomplish this control over the switch machine 8SM the various devices in the third row of the matrix are so associated with the controlling apparatus for that switch machine that when any of the storage devices in this row and in the columns corresponding to tracks 1 to 6 is operated from the abnormal state, it will cause switch machine 8SM to operate to the normal position. Similarly, if any of the devices in this row but in columns representing classification tracks 7 to 12 is operated to the abnormal state, then the switch machine 8SM must be operated to the reverse position. The manner in which this control is accomplished will subsequently be fully described in connection with Fig. 4.

Track switch 8, when in the normal position, leads directly to the lap switches controlled by switch machines 3SM and 5SM. On the other hand, this track switch No. 8 when in its reverse position, leads directly to the lap switches controlled by switch machines 12SM and 10SM. Because of the divergence of these two routes, there is no reason that a cut description cannot occur in one of the storage devices 24 to 29 concurrently with another description in a different cut in one of the storage devices 18 to 23 in the same row. Thus, the first of two successive cuts headed for track No. 3 will have its description transferred from storage device 12, through device 15, to device 26 as soon as the cut occupies the track section associated with switch No. 8. The only necessary condition to effect this transfer is that none of the storage devices in columns 1 to 6 of rows 4 and 5 then be in the abnormal state. Before this first cut reaches the lap switches Nos. 3 and 5 so that a further transfer of the description can take place, the following car, possibly destined for track No. 9, traverses switch No. 8. Its description can then be immediately transferred from device 16, through device 17, to device 20. The organization of the matrix so as to permit cut descriptions to appear concurrently in the same row because of route divergence is illustrated diagrammatically in Fig. 2 by the double vertical lines such as those designated 63 and separating columns 1 to 6 from columns 7 to 12. In any row of the matrix, those storage devices that are interrelated so that none can be operated to the abnormal state unless all are initially in the normal state, are diagrammatically represented as such by dashed horizontal connecting lines. The connections between storage devices in the same column permitting the transfer of cut description from any storage device to the ones immediately below are similarly represented by vertical dashed lines interconnecting adjoining devices in each column.

If a route description appears in column 2 for a cut traveling to classification track No. 2, eventually storage device 25 will be operated to its abnormal state. This condition of storage device 25 acts on the switch machine 3SM to operate it to its normal state, thereby permitting the cut to travel toward switch 2 and thus eventually to track No. 2. A cut travelling to track No. 4 must pass over switch No. 5 as well as switch No. 3. A description for a cut going to track No. 4 appears in column 4 of the matrix and thus eventually operates the storage device 27 to the abnormal condition. This state of storage device 27 not only acts upon the control means for switch machine 3SM to operate it to the reverse position but also acts upon the switch machine 5SM to operate it to the normal position as will be shown in connection with Fig. 4. Therefore, the cut will be routed toward switch machine 4SM and thus eventually to classification track No. 4.

Further transfer of route descriptions for cuts occurs in the same manner through the matrix. Thus, for each cut going to its preselected classification track, eventually the bottommost storage device of the corresponding column of the matrix is operated to the abnormal state, and depending upon which of the two classification tracks emanating from that switch the car is to go to, the corresponding switch machine is operated in the required manner to obtain this routing. As soon as the track section associated with the last switch machine has been occupied, indicating that the desired control has been effective, the associated storage device is returned to its original state thereby erasing the route description from the matrix.

Figure 4A:
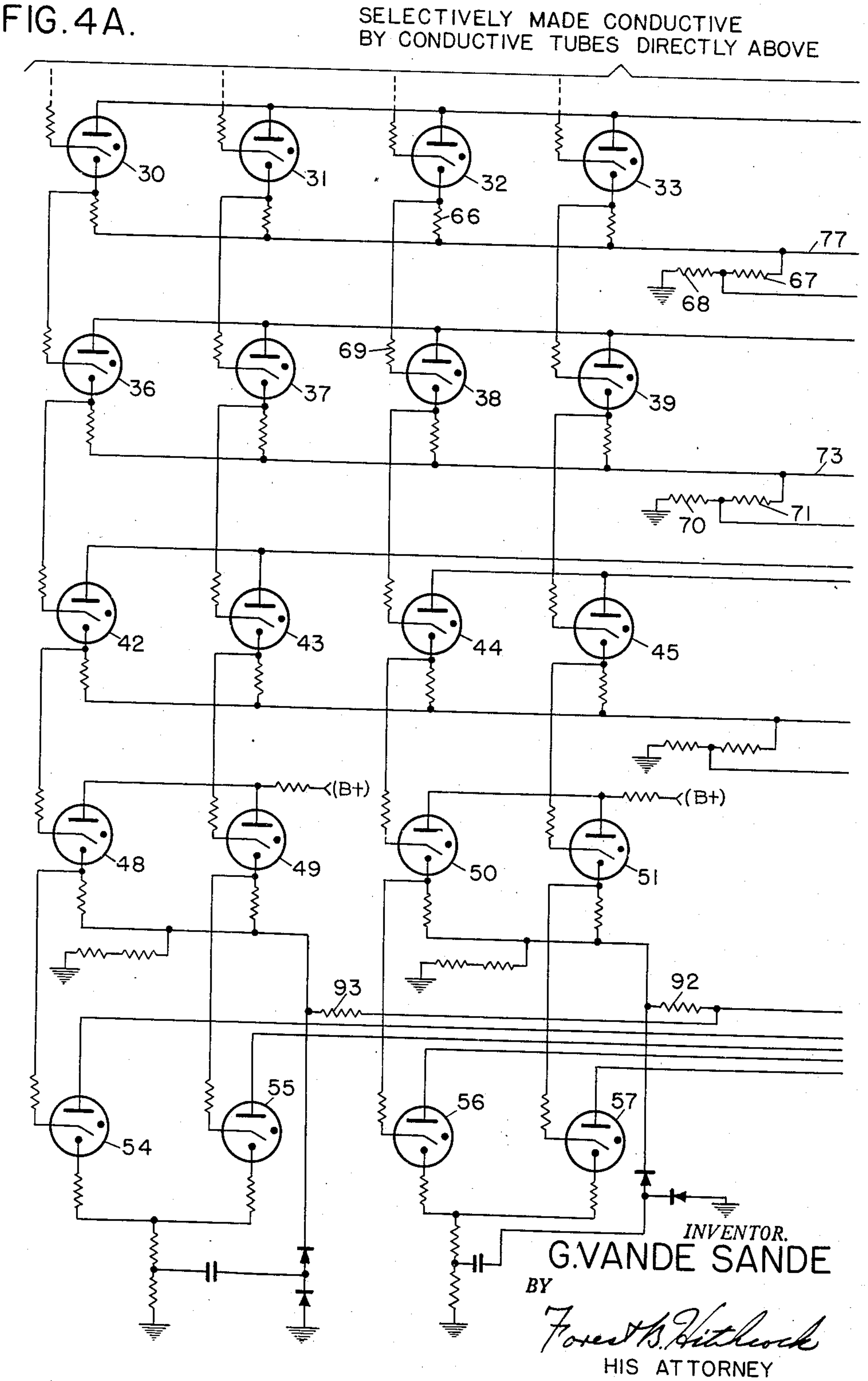
Figs. 4A and 4B, when placed side by side, constitute a circuit diagram illustrating a portion of the matrix.
Figure 4B:
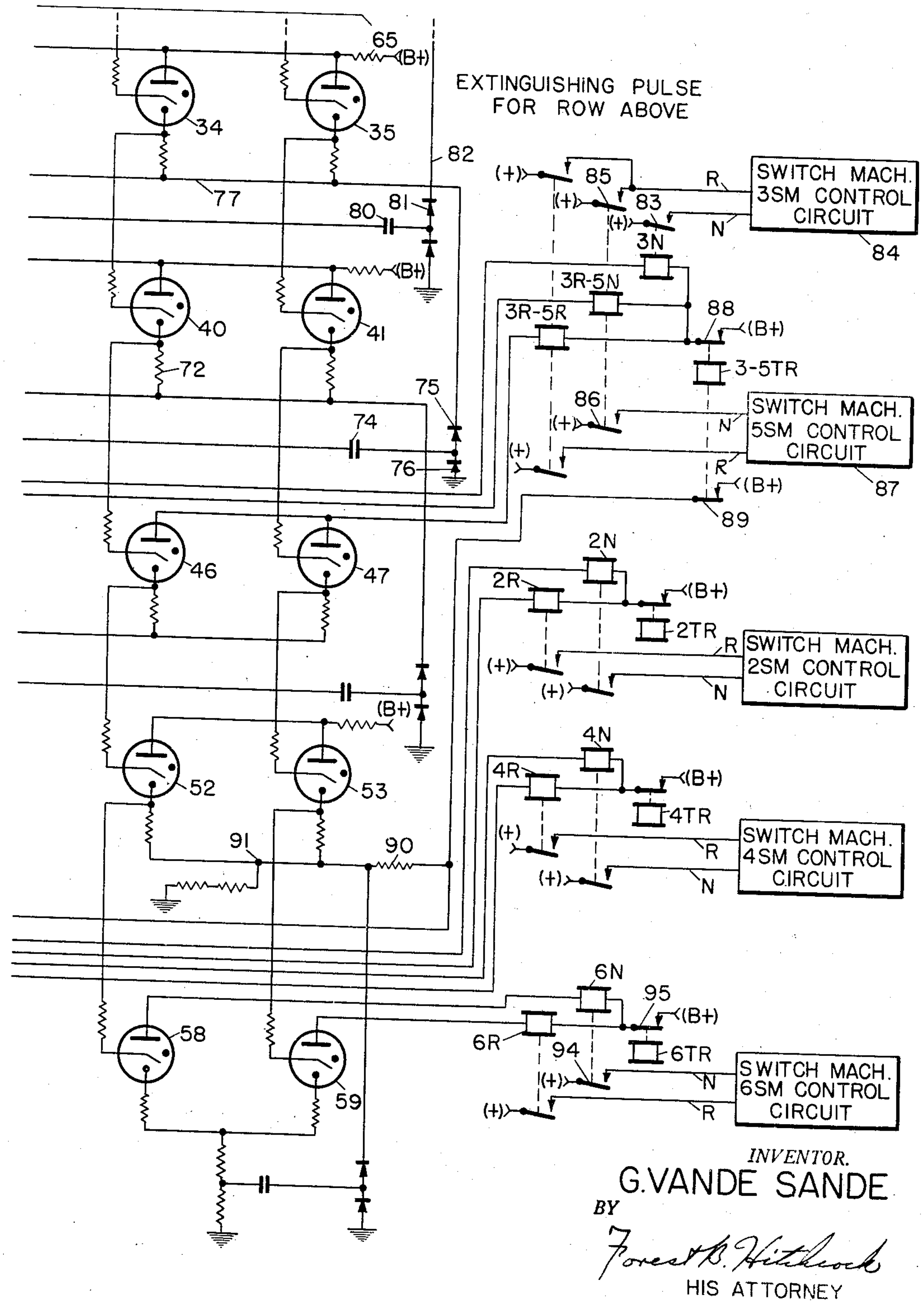

The general principles of this invention apply regardless of the particular kind of storage devices used in the matrix. However, to permit the disclosure of a specific embodiment of the invention, Figs. 4A and 4B illustrate how a portion of the matrix may be constructed using cold cathode grid glow tubes as the storage elements. Each tube is provided with a plate, cathode, and a starter electrode. A tube in the nonconductive state remains in this condition indefinitely unless its starter-cathode voltage is made sufficiently positive for a long enough time to cause a glow discharge to be initiated. This glow quickly transfers to the space between the anode and cathode to cause the tube to be conductive. When once controlled to such a conductive condition, the tube remains in that state until the anode-cathode voltage is sufficiently reduced for a long enough period of time to deionize the tube and extinguish the glow discharge. The conditions of conduction and nonconduction are the two different states of the storage device, and each of these states is a stable one.

The portion of the matrix shown in Figs. 4A and 4B is that corresponding approximately to the lower five rows of the first six columns of Fig. 2. The cold cathode tubes 42 to 47 of the third row shown in Figs. 4A and 4B include all those tubes in the matrix provided for the control of the two lap switch machines 3SM and 5SM. The cold cathode tubes 36 to 41 of the row immediately above comprise a preliminary storage to temporarily store a route description prior to its entry into one of the cold cathode tubes 42 and 47. Tubes 30–35 of the row immediately above comprise an additional storage row similar to that provided by tubes 36 to 41. Two preliminary storages are disclosed in Figs. 4A and 4B rather than merely the one indicated in row 2 of Fig. 2 in order to make clear how the transfer of a description may occur through various preliminary storages ahead of the actual control storage for a switch.

Figure 3:
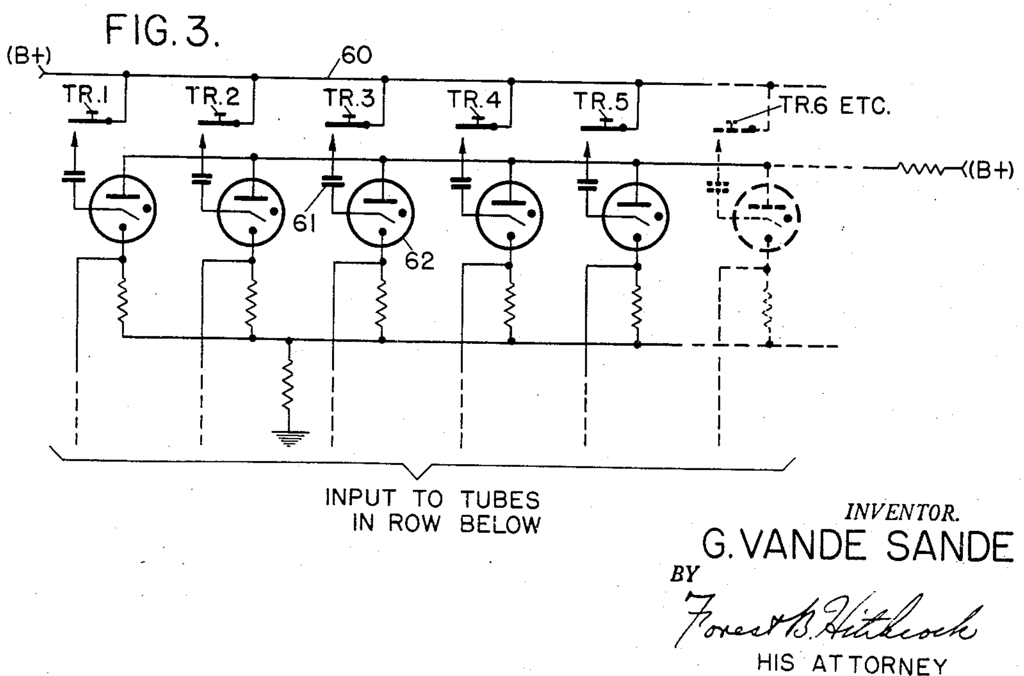
Fig. 3 illustrates the manner in which route designations are applied to the matrix.

Before describing in detail the manner in which route descriptions are transferred through the matrix and how the switches are controlled by the matrix, it is believed desirable to describe how a route description is applied to the matrix. This is illustrated in Fig. 3. A portion of the topmost row of storage tubes of the matrix is shown, there being one tube for each column of the matrix and thus for each classification track. Each of these tubes is normally in the nonconductive state. A (B+) voltage appears on bus 60 and this voltage can be made effective on the starter of any of the cold cathode tubes of this upper row merely by momentarily depressing the push button associated with that tube. For example, to route a cut to classification track No. 3, it is only required that an operator momentarily depress the push button designated TR3. This causes the (B+) voltage to be applied through the contact of this push button and through the capacitor 61 to the starter of cold cathode tube 62. The starter is momentarily driven positive with respect to the cathode by the resulting pulse on the starter so that the tube becomes conductive. In a similar manner, any of the tubes of this topmost row of the matrix can selectively be operated to the conductive state. Although the cut descriptions are shown specifically as being applied to the matrix by means of push buttons in this Fig. 3, this could clearly also be accomplished by other means such as by magnetic or perforated tape, or punched cards, or the like.

If it is assumed that tube 32 of Fig. 4A has been controlled to the conductive state from a controlling influence received from the tube directly above, it can then be shown how this condition can be transferred in succession to the tubes below in the same column with the progression being dependent upon the progress of the car and it can then also be shown how this progression through the matrix provides for the control of the track switch ahead of the car.

At the instant that tube 32 is first made conductive, there is a flow of current from (B+) through the common anode resistor 65, the plate-cathode circuit of tube 32 and through cathode resistors 66, 67 and 68, to ground. Since the resistance of the resistor 65 is relatively low as compared to the resistance of the various cathode resistors 66, 67 and 68, most of the voltage provided by the (B+) source, less the fixed voltage drop between plate and cathode of tube 32, appears between the cathode of this tube and ground.

It is believed expedient to refer to typical values of voltage that may appear in the circuit, although variations of tubes that may be used and various other circuit components may cause these voltage values to differ greatly from one embodiment of the invention to another. In a typical situation, however, the (B+) voltage may be at about 180 volts above ground. When the tube 32 is made conductive, there is a fixed voltage drop of rougly 60 volts between plate and cathode. Since there is a voltage drop of only a relatively few volts across the plate resistor 65, substantially 120 volts appears between the cathode of tube 32 and ground. This voltage at the cathode of tube 32 is applied through a resistor 69 to the starter of the cold cathode tube 38 in the next adjoining row of the matrix. If none of the tubes 36 to 41 is then in the conductive state, then there will be no current flow through the cathode resistors 70 and 71. The cathode of the tube 38 as well as the cathode of all the other tubes 36 to 41 will then be substantially at ground potential. With the cathode of tube 38 at ground and the starter at approximately 120 volts above ground, tube 38 will immediately fire since the cold cathode tube characteristics are such that a tube will fire within the range of starter-to-cathode voltage of 65 to 105 volts. The 120 volt starter-to-cathode voltage now effective is thus more than sufficient to fire this tube.

On the other hand, if one of the tubes 36 to 41 such as tube 40, for example, were conductive, there would then be a flow of current through the cathode resistors 72, 71 and 70 to ground. This would raise the voltage at the cathode of tube 40 to approximately 120 volts above ground and with the proportioning of the value of the resistors 72, 71 and 70 being such as to have approximately equal resistance in resistor 72 as compared to the series combinations of resistors 70 and 71, the voltage on wire 73 would be substantially 60 volts. This same 60 volt potential then appears at the cathode of tube 38 and all the other tubes of this row as well. With the starter of tube 38 at 120 volts and the cathode at 60 volts, only a 60 volt difference of potential exists between these two electrodes and this is not sufficient to make the tube conductive. Thus, the conductive condition of any one of the tubes 36 to 41 prevents any other of these tubes from becoming conductive in response to the conductive condition of the tube in the row immediately above.

If it is assumed, however, that the tubes 36 to 41 are empty of any other route description, i.e. none of them is conductive, then the conductive state of tube 32 can readily transfer to tube 38. Upon the instant of firing tube 38, there is a sudden increase of voltage across the cathode resistor 70. This voltage rise is applied through a capacitor 74 to the junction of two rectifiers 75 and 76. The rise in voltage across resistor 70 produces a charging of capacitor 74 through rectifier 75 in a forward or low resistance direction and through resistors 67 and 68 in the common cathode for the row of tubes above. This results in an abrupt rise in voltage on wire 77, and the duration of this voltage pulse is determined by the time constant for the charging of capacitor 74. The circuit components are so selected in value that the amplitude and duration of this pulse will sufficiently raise the voltage of all the cathodes of tubes 30 to 35 to cause the particular tube then conductive to be extinguished. In this instance, since tube 38 was fired in response to the conductive condition of tube 32, it would be this tube 32 which would be extinguished by the positive voltage pulse appearing on wire 77.

Later when tube 38 has caused the firing of tube 44 and is then itself extinguished, the voltage across cathode resistor 70 is quickly restored to zero volts. It is desirable that the resultant discharging of capacitor 74 not produce a voltage pulse on wire 77 since this might cause the erroneous firing of the tubes 30 and 35. It is for this reason that the rectifier 75 is provided which prevents the discharge current from passing over wire 77. An alternate discharging circuit for capacitor 74 is provided by the rectifier 76 which is so connected that it provides a low resistance for the discharge current.

The positive extinguishing pulse that appears on wire 77 in order to render nonconductive the particular one of the tubes 30 to 35 that is nonconductive, also appears with reduced amplitude across resistor 68. This pulse causes the charging of capacitor 80 with the result that a positive voltage pulse is then applied through rectifier 81 in the forward direction and appears on wire 82. This pulse then is applied to the tubes of the row above in the matrix and raises the potential of all the common cathodes in such row above. It is, of course, desirable that the voltage pulse of wire 77 act only upon the tubes 30 to 35 and not be effective to extinguish any tube two rows above. It is for this reason that a resistor having a small value of resistance is included in the common anode circuit of all the tubes such as resistor 65 provided for the tubes 30 to 35. Thus, the pulse of low amplitude appearing on wire 82 as a result of the pulse that appears on wire 77 from the row below does raise the cathode potential of all the tubes in such row by an amount equal to the pulse amplitude. However, the plates of all such tubes are able to raise in voltage by an amount corresponding to the voltage drop then appearing across the resistor in the common anode circuit of such tubes. In other words, if the resistor in such row in the common anode circuits is of a value that causes the common anode voltage to be 10 volts less than the (B+) voltage when any of the tubes is conductive, for example, then a 10 volt extraneous pulse may appear on wire 82 and raise the cathode voltage of such tubes without appreciably effecting the anode-cathode voltage of the then conducting tube. The reason for this is that as the cathode voltage of the conducting tube is increased, the anode voltage is able to raise by a corresponding amount so that the net voltage between anode and cathode remain substantially the same. It is only when this extraneous pulse is appreciably above the 10 volts amplitude that the cathode of the conducting tube will be so raised with respect to the plate as to cause the extinguishing of such tube.

Tubes 42 to 47 are provided for the control of the two switch machines 3SM and 5SM. For a cut that is to travel to classification tracks 1 or 2, either tube 42 or 43 is made conductive, respectively. These two tubes have a common plate circuit which includes the winding of relay 3N so that this relay will pick up when either of tubes 42 or 43 becomes conductive. This relay should have a resistance that is relatively low as compared to the resistance in the cathode circuit of either tubes 42 or 43. This is necessary in order that either tube, when conductive, will have its cathode sufficiently raised in voltage above ground to fire the tube immediately below. The picking up of this relay causes its front contact 83 to close, and this provides an input to the switch machine 3SM control circuits 84 that causes the switch 3 to have its switch points operated to the normal position. This permits a cut whose description appears in the first two columns to be properly routed over switch No. 3 in the normal position and thus travel toward track switch No. 2.

When a cut is to travel to any of the classification tracks 3 to 6, the route description appears in one of the columns 3 to 6 of the matrix, respectively. If either tube 44 or 45 is conductive, the relay 3R–5N appearing in the plate circuit of these two tubes is picked up. The closure of front contact 85 of this relay then acts on the switch machine 3SM control circuit 84 to cause switch No. 3 to operate to the reverse position. At the same time, the closure of front contact 86 of this relay provides an input voltage to the switch machine 5SM control circuits 87 causing this switch machine to operate the points of switch machine No. 5 to the normal position. In this way, a car routed to travel to either track 3 or 4 will then be permitted to move toward switch No. 4. In a similar way, the conductive condition of either tubes 46 or 47 causes relay 3R–5R to pick up, resulting in the operation of switch No. 3 to the reverse position and switch No. 5 to the reverse position.

The route description for any cut remains in a switch control storage row of the matrix such as that including tubes 42 to 47, until the corresponding cut enters the track circuit associated with these switches. Thus, as shown in Figs. 4A and 4B, there is no extinguishing pulse circuit effective on any of the tubes 42 to 47 from the tubes of the row below. Instead, the conductive condition of any of these tubes 42 to 47 is maintained until the dropping away of track relay 3–5TR results in the opening of its front contact 88 so that (B+) energy can no longer be provided for the plates of these tubes. The particular one of these tubes that is then conductive is quickly extinguished.

Although the particular one of these tubes 42—47 that was conductive had its cathode at a high potential and thus was supplying the starter of the tube below with a high voltage as well, a transfer of conductivity could not take place until the dropping away of relay 3–5TR. The reason for this is that the closed front contact 89 of relay 3–5TR causes a positive voltage to be applied from (B+) through a coupling resistor 90 to the junction point 91 and thus raises the cathode voltage of both tubes 52 and 53. This voltage is also applied through decoupling resistors 92 and 93 to the cathode circuits of tubes 48 and 49 and to tubes 50 and 51, respectively. The raised cathode voltages of these tubes thus prevents any one of them from being conductive in response to the high starter voltage it may receive from a tube in the row above. Immediately upon the dropping away of relay 3–5TR, this biasing voltage is removed, so that the tube 48 to 53 can become responsive to controlling inputs they receive from corresponding tubes in the row above. It is recognized that the dropping away of relay 3–5TR which removes this biasing voltage at front contact 89 also results in the extinguishing of any of the tubes 42 to 47 then in a conductive state, so that such tube can then no longer provide the high cathode voltage to act upon the tube in the row below. Ordinarily, however, the deionization time of such a tube is sufficiently longer than the time required for it to become ionized that a tube such as tube 52 will be fired prior to the complete extinction of a tube 46. In addition, it may be desirable to connect a capacitor having a very small amount of capacity probably in the order of a few micro-micro-farads from the starter of each of the tubes 48 to 53 to ground. This will tend to maintain the starter of any tube then elevated in potential from the tube above from being immediately dropped to near ground level when the tube above is extinguished by the dropping away of relay 3–5TR.

After passing over the lap switches 3 and 5, a cut will next pass over one of the final route selecting switches 2, 4 or 6. Therefore, the only criterion for passing a cut description from tubes 42 and 43, for example, to the row below is that neither of the tubes 48 and 49 should then be conductive. However, if a cut description has been transferred to one of the two tubes 48 and 49, a subsequent cut description can readily be transferred from one of the tubes 46 or 47 to a corresponding tube 52 or 53 below, provided that neither tube 52 or 53 is conductive. The divergence of routes at the lap switches eliminates the possibility of conflict between successive cuts so that cut descriptions can appear concurrently in the pairs of tubes 48 and 49, 50 and 51, and also 52 and 53.

To provide this mode of operation of the transfer circuits, each pair of tubes is provided with a portion of their cathode circuits in common so that a conductive state of one tube will so raise the cathode potential of both tubes of the pair that they cannot be made conductive by the high cathode potential that may be applied from a tube in the row above. However, the conductive state of tube 52, for example, has no effect upon the cathode potential of tubes 50 and 51 so that either of these can become conductive if it receives a high potential on its starter on the cathode of the respective tube 44 or 45.

Tubes 54 to 59 in the bottommost row of the matrix provide for the control of the switches 2, 4 and 5. For example, a cut routed to track No. 5 will cause tube 58 to become conductive, and this will result in the picking up of relay 6N. The closed front contact 94 of relay 6N acts on the switch machine 6SM control circuit to operate this switch to the normal position and thus permit the cut to travel to classification track 5. On the other hand, a route description causing tube 59 to become conductive results in the picking up of relay 6R so that switch machine 6SM operates the points of switch machine 6 to the reverse position, and the associated cut can then travel directly to classification track No. 6. As soon as the cut has entered the track circuit associated with the switch machine No. 6, relay 6TR drops away and opens its front contact 95 so that whichever tube 58 or 59 is conductive is extinguished and the description is then erased from the matrix.

Although only a portion of the matrix is shown in Figs. 4A and 4B, it is believed that it will be understood by analogy from the description that has been given and from the drawings how this portion can be extended to accommodate classification tracks of any conceivable size. The number of storages that may be provided in successive rows of the matrix ahead of the row actually utilized for control in the switch machines is in no way limited and may be selected entirely in accordance with existing conditions.

Having described an automatic switching system employing a matrix of bi-stable state devices as one specific embodiment of this invention, I desire it to be understood that various other forms, modifications and adaptations can be made to the illustrated form without in any manner departing from the spirit or scope of this invention.

What I claim is:

1. In an automatic switching system for a railway car classification yard, a stretch of track extending over a plurality of route-selecting switches to a number of classification tracks, a rectangular matrix of bi-stable state storage devices comprising, a column of said devices corresponding to each of said classification tracks, each of said columns including a bi-stable state device for each route selecting switch that a car must traverse to reach the corresponding classification track, circuit means for operating said device in the upper-most row of a selected column from the normal to the abnormal state when it is desired to route a car to the particular classification track corresponding to that column, transfer circuit means for successively transferring to the abnormal state the devices of a column one at a time in order according to the switch-by-switch progression of the car through the yard to thereby advance each car description through its respective column, switch controlling means for each route-selecting switch including all the bi-stable state devices of a particular row relating to the same track switch, said switch controlling means acting to distinctively control said switch to its respective normal or reverse condition in accordance with the column in which said car description appears, said switch thereby being operated to the position required to give access to the particular classification track corresponding to that column.

2. In an automatic switching system for vehicles, a single track diverging to a number of classification tracks via a plurality of track switches, a plurality of bi-stable state storage devices arranged in an array of rows and columns perpendicular to each other, a separate column being provided for each of said classification tracks, each column in said array including a bi-stable state device for each track switch that a vehicle must traverse to reach the corresponding classification track, circuit means for operating the upper-most device of a selected column from the normal to the abnormal state when it is desired to route a vehicle to the particular classification track corresponding to that column, transfer circuit means for successively transferring the abnormal state of the upper-most device of a column from one device to another in that column successively as the respective vehicle progresses from switch to switch in its route, switch operating means for each track switch being selectively operable to either of two distinctive conditions to effect respective reverse or normal operations of said switch, said bi-stable state devices in said array having respectively associated therewith the switch operating means of the corresponding track switch, said bi-stable state device acting on the associated switch operating means when operated to the abnormal state to selectively operate said switch to its normal or reverse conditions in accordance with the column of said array in which the car description appears to thereby operate said switch to the position required to permit the vehicle to travel to the particular classification track corresponding to the column in which the vehicle description appears.

3. The organization according to claim 1 wherein said transfer circuit means is effective to transfer the abnormal state of a bi-stable state storage device from one row to the adjoining row below only when none of the devices in said adjoining row and in a common group relating to a particular switch is then in the abnormal state indicating storage of a car description.

4. In an automatic switching system, a track diverging to a number of classification tracks via a plurality of route-selecting switches, a plurality of bi-stable state storage devices arranged in a rectangular matrix of rows and columns perpendicular to each other, a column of said devices being provided for each of said classification tracks, each of said columns in said matrix including a bi-stable state device for each route-selecting switch that a car must pass over to reach the corresponding classification track, whereby there corresponds to each of said route-selecting switches a group of said bi-stable state devices in a particular row of said matrix, circuit means for operating the upper-most device of a selected column from the normal to the abnormal state when it is desired to route a car to the particular classification track corresponding to that column, transfer circuit means for successively transferring the abnormal state of the upper-most device of a column from one device to another in that column successively as the respective car progresses through the yard from switch to switch, switch operating means for each route-selecting switch being selectively controlled to operate the associated switch to respective normal or reverse conditions by said group of associated devices in the respective row, said switch operating means being distinctively controlled to one condition when one of a selected portion of the associated group of devices is operated from the normal condition and to the opposite condition when one of the remainder of the devices in said group is operated from the normal condition, said switch thereby being operated to the position required to permit the car to travel towards the particular classification track corresponding to that column.

5. In an automatic switching system, a track diverging to a number of classification tracks via a plurality of route-selecting switches, a plurality of bi-stable state storage devices arranged in a matrix of rows and columns perpendicular to each other, a column of said devices being provided for each of said classification tracks, each of said columns in said matrix including a switch controlling bi-stable state device for each route-selecting switch that a car must pass over to reach the corresponding classification track, plus additional bi-stable state storage devices interspersed between these as required to give additional storage capacity to accommodate successive vehicles, whereby there corresponds to each of said route selecting switches a group of said switch controlling bi-stable state devices in a particular row of said matrix, circuit means for operating the upper-most device of a selected column from the normal to the abnormal state when it is desired to route a car to the particular classification track corresponding to that column, transfer circuit means for successively transferring the abnormal state of the upper-most device of a column from one device to another in that column successively as the respective car progresses through the yard from switch to switch, restoring circuit means being effective upon the operation of one of said bi-stable state devices to the abnormal condition by the device immediately above to restore said device immediately above to its normal state, switch operating means for each route-selecting switch being selectively controlled to operate the associated switch to respective normal or reverse conditions by said group of associated switch controlling devices in the respective row in accordance with the column in which the abnormal state device appears, said switch thereby being operated to the position required to give access to the particular classification track corresponding to that column.

6. In an automatic switching system for a railway vehicle classification yard, a track diverging to a number of classification tracks via a plurality of route-selecting switches, a plurality of gas discharge tubes arranged in a rectangular matrix of rows and columns perpendicular to each other, a column of said matrix being provided for each of said classification tracks, each of said columns including a gas discharge tube for each route-selecting switch that a vehicle must traverse to reach the corresponding classification track, each of said gas discharge tubes being normally in a nonconductive condition, circuit means for operating the gas discharge tube in the uppermost row of a selected column from its normal nonconductive state to a conductive state when it is desired to route a vehicle to the particular classification track corresponding to that column, circuit means governed by the output voltage from a conductive gas discharge tube and acting upon the input circuit means of the tube immediately below for successively transferring to the conductive state the gas discharge tubes of a column one at a time in order according to the switch-by-switch progression of the vehicle through the classification yard to thereby advance each vehicle description through its preselected column, switch control means for each route-selecting switch including the gas discharge tubes of a particular row relating to the same track switch, said switch control means acting to distinctively control said switch to its respective normal or reverse condition in accordance with the column in which the vehicle description appears, said switch thereby being operated to the position required to give access to the particular classification track corresponding to that column.

7. In an automatic switching system for a railway car classification yard, a stretch of track extending over a plurality of route-selecting switches to a number of classification tracks, a matrix of gas discharge tubes comprising, a column of tubes corresponding to each of said classification tracks, each of said columns including a tube for each route-selecting switch that a car must traverse to reach its preselected classification track, each of said gas discharge tubes being normally in a nonconductive state, whereby there corresponds to each of said route-selecting switches a group of said tubes in a particular row of said matrix, circuit means for making conductive the uppermost tube of a selected one of said columns when it is desired to route a car to the particular classification track corresponding to that column, transfer circuit means responsive to the output voltage of a tube when in the conductive state to make conductive the tube immediately below in the same column, said transfer circuit means being effective only provided that all of the tubes in the row below relating to the same track switch as the tube immediately below are then in the nonconductive state, switch operating means for each route selecting switch being distinctively controlled to operate the associated switch to respective normal and reverse conditions by said group of associated tubes in the respective row of said matrix, said switch operating means being distinctively controlled to one condition when one of a selected portion of the associated group of tubes is conductive and to the opposite condition when one of the remainder of the tubes in said group is conductive, said switch thereby being operated to the position required to permit the car to travel towards the particular classification track corresponding to that column.

8. In an automatic switching system for vehicles, a single track providing access over a plurality of route-selecting switches to a number of classification tracks, a matrix of gas discharge tubes comprising, a column of tubes corresponding to each of said classification tracks, each of said columns including a tube for each route-selecting switch that a car must traverse to reach the corresponding classification track, each of said tubes being normally in a nonconductive state, whereby there corresponds to each of said route-selecting switches a group of gas discharge tubes in a particular row of said matrix, circuit means for making conductive the uppermost tube of a selected one of said columns when it is desired to route a car to the particular classification track corresponding to that column, transfer circuit means responsive to the output voltage of a tube when in the conductive state to make conductive the tube immediately below in the same column, all of said tubes in a row relating to the same track switch having a portion of their cathode circuits in common to thereby provide a disabling positive cathode bias for all said tubes when one is in the conductive state and make said transfer circuit means ineffective, switch control means for each route-selecting switch including all the gas discharge tubes of the respective row relating to said switch, said switch control means acting to distinctively control said switch to its respective normal or reverse condition in accordance with the column of said group in which the conductive tube appears, said switch thereby being operated to the position required to give access to the particular classification track corresponding to that column.

9. In an automatic switching system for vehicles, a single track diverging to a number of classification tracks via a plurality of track switches, a matrix of gas discharge tubes arranged in rows and columns, a column of said tubes being provided for each of said classification tracks, each of said columns including a tube for each track switch that a car must traverse to reach a corresponding classification track, whereby there corresponds to each of said route selecting switches a group of said tubes in a particular row of said matrix, each of said tubes being normally in a nonconductive state, circuit means for operating the uppermost tube of a selected column from the normal nonconductive state to the conductive state when it is desired to route a vehicle to the particular classification track corresponding to that column, transfer circuit means responsive to the output voltage of a tube when in the conductive state to make conductive the tube immediately below in the same column, vehicle detecting circuit means associated with each track switch and being distinctively operated by the presence of a vehicle at the respective switch, said transfer circuit means being governed by said vehicle detecting means to thereby cause the conductive condition to be transferred from tube to tube in a column in accordance with the switch-by-switch progression of the car through the yard, switch operating means for each track switch being distinctively controlled to operate the associated switch to respective normal and reverse conditions by said group of associated tubes in the respective row of said matrix, said switch operating means being distinctively controlled to one condition when one of a selected portion of the associated group of tubes is conductive and to the opposite condition when one of the remainder of the tubes in said group is conductive, said switch thereby being operated to the position required to permit the car to travel toward the particular classification track corresponding to that column.

10. In an automatic switching system for vehicles, a single track diverging to a number of classification tracks via a plurality of track switches, a matrix of gas discharge tubes arranged in rows and columns, a column of said tubes being provided for each of said classification tracks, each of said columns including a switch control tube for each track switch that a car must traverse to reach the corresponding classification track plus additional storage tubes interspersed between these as required to give additional storage capacity, each of said tubes being normally in a nonconductive state, circuit means for operating the uppermost tube of a selected column from the normal nonconductive state to the conductive state when it is desired to route a vehicle to the particular classification track corresponding to that column, transfer circuit means responsive to the output voltage of a tube in the conductive state to make conductive the tube immediately below in the same column, said transfer circuit means being effective only provided that all of the tubes in the row below relating to the same track switch as the tube immediately below are then in the nonconductive state, said transfer circuit means acting to transfer the conductive state from a switch control tube to the tube immediately below in the same column only as the respective vehicle has progressed to the corresponding switch, switch controlling means for each route selecting switch including the switch control tubes of the particular row relating to the respective switch, said switch control means acting to distinctively control said switch to its respective normal or reverse conditions in accordance with the column in which a conductive tube appears, said switch thereby being operated to the position required to give access to the particular classification track corresponding to that column.

11. In an automatic switching system for vehicles, a tingle track providing access over a plurality of route-selecting switches to a number of classification tracks, a matrix of gas discharge tubes comprising, a column of tubes corresponding to each of said classification tracks, each of said columns corresponding to each of said classification tracks, each of said columns including a tube for each route-selecting switch that a car must traverse to reach the corresponding classification track plus additional storage tubes interspersed between these as required to give storage capacity to accommodate successive vehicles, each of said tubes being normally in a nonconductive state, whereby there corresponds to each of said route-selecting switch a group of switch control gas discharge tubes in a particular row of said matrix and an additional row of storage tubes, circuit means for making conductive the uppermost tube of a selected one of said columns when it is desired to route a car to the particular classification track corresponding to that column, transfer circuit means responsive to the output voltage of a tube when in the conductive state to make conductive the tube immediately below in the same column, vehicle detecting circuit means associated with each track switch and being distinctively operated by the presence of a vehicle at the respective switch, said transfer circuit means being governed by said vehicle detecting means to thereby cause the conductive condition to be transferred from the respective switch control tube to the storage tube immediately below in the same column and acting concurrently to restore to the nonconductive condition the respective switch control tube, restoring circuit means acting on each storage gas discharge tube to restore it to the normal nonconductive state upon the operation of the tube immediately below to the conductive state, switch operating means for each track switch acting to distinctively control said switch to its respective normal or reverse condition in accordance with the column in which the conductive tube appears, said switch thereby being operated to the position required to give access to a particular classification track corresponding to that column.

References Cited in the file of this patent

UNITED STATES PATENTS

| | | |
|---|---|---|
| 2,194,352 | Brixner et al. | Mar. 19, 1940 |
| 2,194,353 | Brown et al. | Mar. 19, 1940 |
| 2,623,108 | Holden | Dec. 23, 1952 |
| 2,658,166 | Depp | Nov. 3, 1953 |
| 2,685,683 | Holden et al. | Aug. 3, 1954 |
| 2,700,728 | Brixner et al. | Jan. 25, 1955 |
| 2,719,250 | Six et al. | Sept. 27, 1955 |